United States Patent [19]
White

[11] Patent Number: 4,870,555
[45] Date of Patent: Sep. 26, 1989

[54] HIGH-EFFICIENCY DC-TO-DC POWER SUPPLY WITH SYNCHRONOUS RECTIFICATION

[76] Inventor: Alan V. White, 23419 Lazy Hollow La., Hockley, Tex. 77447

[21] Appl. No.: 258,213

[22] Filed: Oct. 14, 1988

[51] Int. Cl.$^4$ ......................................... H02M 3/335
[52] U.S. Cl. ....................................... 363/21; 363/56; 363/127
[58] Field of Search ..................... 363/16, 20, 21, 26, 363/56, 127; 323/282

[56] References Cited

U.S. PATENT DOCUMENTS 4,633,381 12/1986 Upadhyay .............................. 363/56
4,716,514 12/1987 Patel .................................... 363/127

FOREIGN PATENT DOCUMENTS 35564   2/1984  Japan .................................... 363/21
204466 11/1984  Japan .................................... 363/21
59973   4/1985  Japan .................................... 363/21
124767  5/1988  Japan .

OTHER PUBLICATIONS

International Rectifier, Data Sheet No. PD-9.515A, for HEXFET Transistors IRF020 et seq., dated prior to 1988, pp. C-17, C-23, C-24.

Motorola TMOS Power MOSFET Data Book, dated prior to 1988, pp. 1-1-6 to 1-1-11.
James Blanc, "Low-Voltage MOSFETs for Use as Synchronous Rectifiers", Interface, Publication of Siliconix, Inc., Winter 1987, pp. 20-21.

Primary Examiner—William H. Beha, Jr.

[57] ABSTRACT

A synchronous rectifier power supply circuit has a pair of power MOS transistors connected in series with the primary and secondary of a transformer, respectively; and another power MOS transistor connected across an inductive load on the secondary side. The gates of the pair of transistors are driven by a pulse source which is pulse-width modulated in response to the load voltage, and the other transistor has its gate driven by the inverse of the pulse source. To prevent current spikes and power losses due to the pair of transistors being on during a transition period at the same time the other transistor is on, a high-gain bistable logic circuit is used to drive the gates; A NOR gate prevent the gate of the other transistor from rising to a turn-on voltage until the gates of the pair of transistors are at below a turn-on voltage. A second NOR gate prevents the gates of the pair of transistors from reaching a turn-on voltage until the gate of the other transistor is below a turn-on voltage.

20 Claims, 3 Drawing Sheets

HIGH-EFFICIENCY DC-TO-DC POWER SUPPLY WITH SYNCHRONOUS RECTIFICATION

BACKGROUND OF THE INVENTION

This invention relates to power supply circuits, and more particularly to a high-efficiency switching regulator circuit.

When a portable computer is operated on battery power, low power consumption becomes important so that the size and weight of the batteries required to provide the desired running time will be reduced. Also, since it is preferable to omit a fan in the design of battery powered equipment, high efficiency is needed to avoid high temperatures in power supply components.

Synchronous rectifier circuits are widely used for reducing losses due to voltage drop across a rectifier. Bipolar and MOS transistors are available which provide synchronous rectification with rectifier drops of less than about 0.25 V, allowing an efficiency of rectification of greater than 90% for a 5 V power supply output, as would typically be used in a portable computer; this can result in an overall DC-to-DC efficiency of greater than 80% in a switching converter/regulator. A switching regulator using low-voltage MOSpower transistors is show in an article by James Blanc, Interface, published by Siliconix Incorporated, Winter 1987, pp. 20-21; this circuit is especially useful as a power supply for a low-voltage digital IC system, where the forward drop of more conventional rectifiers would be a larger fraction of the desired output voltage. However, it is desirable to improve this efficiency to reduce the heat generated in the power supply components and to reduce the battery size and weight. One of the main sources of switching losses is improper timing of the drive signals to the rectifier transistors; if both rectifiers are on simultaneously in a typical circuit, the transformer winding is effectively shorted, resulting in power losses and high voltage spikes from energy stored in transformer leakage inductance.

It is therefore the principal object of this invention to provide an improved power supply circuit for use in a portable computer or the like. Another object is to provide a high-efficiency synchronous rectifier circuit. A further object is to provide a method of controlling the gates of power FETs in a switching regulator to prevent current spikes at transitions. An additional object is to provide a power supply circuit for a small portable electronic device, particularly a circuit which will allow the use of minimum-sized batteries and will generate a minimum of heat so that a cooling fan will not be needed.

SUMMARY OF THE INVENTION

In accordance with one embodiment of the invention, a synchronous rectifier power supply circuit has a pair of power MOS transistors connected in series with the primary and secondary of a transformer, respectively and another power MOS transistor connected across an inductive load on the secondary side. The gates of the pair of transistors are driven by a pulse source which is pulse-width modulated in response to the load voltage, and the other transistor has its gate driven by the inverse of the pulse source. To prevent current spikes and power losses due to the pair of transistors being on during a transition period at the same time the other transistor is on, a high-gain bistable logic circuit is used to drive the gates; A NOR gate prevent the gate of the other transistor from rising to a turn-on voltage until the gates of the pair of transistors are at below a turn-on voltage. A second NOR gate prevents the gates of the pair of transistors from reaching a turn-on voltage until the gate of the other transistor is below a turn-on voltage.

BRIEF DESCRIPTION OF THE DRAWINGS

The features believed characteristic of the invention are set forth in the appended claims. The invention itself, however, as well as other features and advantages thereof, may best be understood by reference to the detailed description of a specific embodiment which follows, when read in conjunction with the accompanying drawings, wherein:

DETAILED DESCRIPTION OF A SPECIFIC EMBODIMENT

Figure 1:
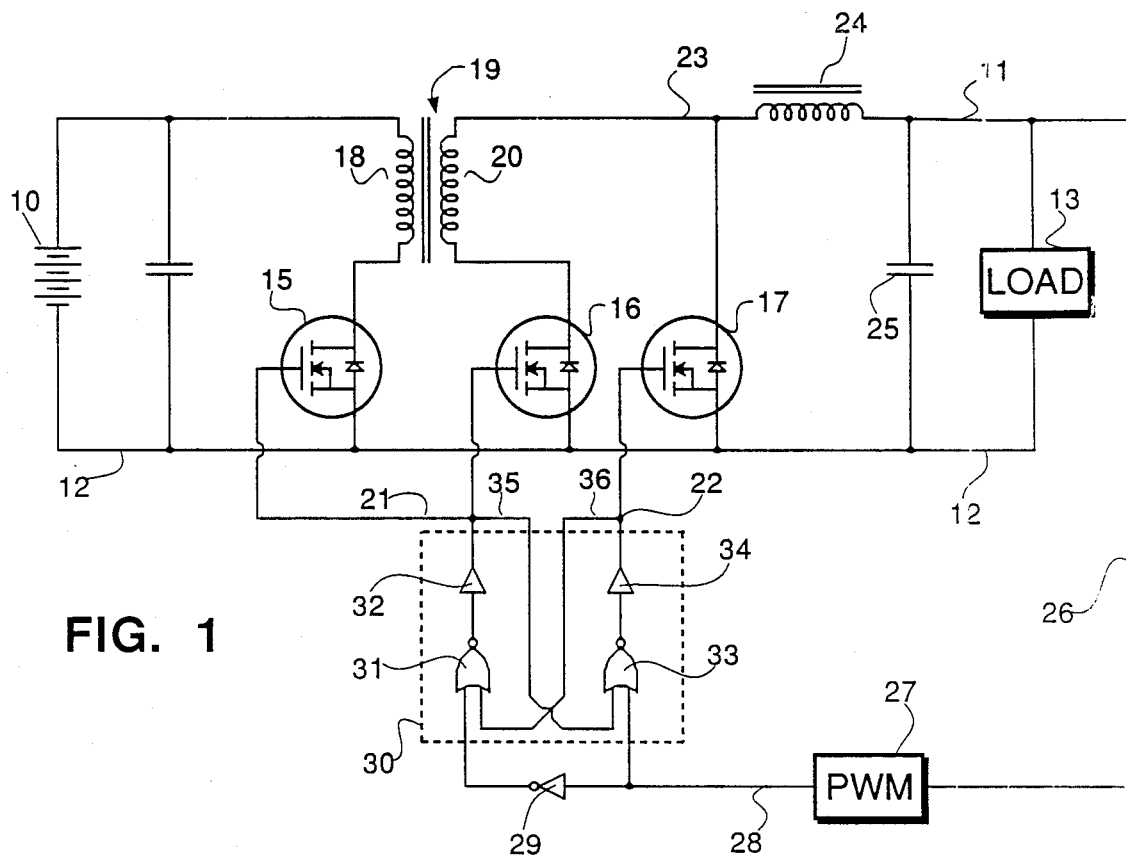
FIG. 1 is an electrical schematic diagram of a synchronous regulator power supply circuit according to one embodiment of the invention.

With reference to FIG. 1, a synchronous rectifier type of power supply circuit is shown according to an example of an embodiment of the invention. This circuit is used to convert the output of a 12 V battery 10, usually of the nickel-cadmium type, to a 5 V supply on line 11. This type of power supply would be used in a laptop-type portable computer, for example, where an AC adapter would usually be employed to charge the battery 10 and to supply power when plugged into a 120 V AC line (a switching regulator power supply circuit for providing this AC adapter function, also using MOS power transistors as herein used, is shown in my copending application Ser. No. 258,220 filed herewith, assigned to Compaq Computer Corporation). In the circuit of FIG. 1, a common or ground line 12 is shared by both the battery 10 and a load 13, where this load is comprised of all of the microprocessor chips, memory chips, logic chips, controllers, and the like for the computer. The object is to produce a regulated voltage on line 11 of perhaps 5 V±1% over a range of voltages on the battery 10 of perhaps 10 V to 18 V.

The synchronous rectifier circuit of FIG. 1 employs three power MOS field effect transistors 15, 16 and 17. These devices are commercially available under the part number IRFU020 from International Rectifier Corporation of El Segundo, California. Each of these transistor devices functions as a rectifier that will conduct in the forward direction even though the gate is not driven to a point where it will turn on the transistor; nevertheless, the forward drop is substantially reduced by driving the gate-to-source voltage above the threshold. The transistor 15 has its source-to-drain path connected in series with the primary winding 18 of a transformer 19, and the transistor 16 has its source-to-drain path connected in series with the secondary winding 20 of this transformer. The gates of the transistors 15 and 16 are connected together at a node 21 so these two transistors will always have the same gate voltage, while the gate of the transistor 17 is connected to a node 22. The transistor 17 has its source-to-drain path connected across the series combination of the secondary winding 20 and the transistor 16, that is, between node 23 and common node 12. The load 13 is connected between the node 23 and the common node 12 through an inductor 24 which forms an LC filter along with a capacitor 25. The voltage at the output node 11, across the load 13, is detected and fed back by a line 26 to a pulse width modulator 27 which generates 12V pulses of a frequency of about 50-KHz to drive the nodes 21 and 22, and thus to control the transistors 15, 16 and 17. The pulse width modulator is of standard design and may be a commercially available part, or may be constructed from standard CMOS logic devices. The output of the pulse width modulator 27 on line 28 is of the waveform seen in FIG. 2, where the width of the rectangular pulses will vary according to the feedback voltage on line 26 in such a way as to maintain a constant voltage on the output node 11. This output on line 28 is inverted by an invertor 29 so that the voltages applied to the nodes 21 and 22 will be out of phase; i.e., when the voltage on node 21 is high, the voltage on the node 22 will be low, and vice versa.

The operation of the circuit of FIG. 1 is based upon turning on both of the transistors 15 and 16 so that a pulse of current will flow through the primary winding 18 of the transformer 19, causing a corresponding pulse of current to flow through the secondary winding 20 and thus through the inductor 24 and the load 13 (or into the capacitor 25); during this period, current flow through the transistor 17 from node 23 to the common node 12 is blocked because the transistor is turned off and it is also connected in the blocking direction. When the transistors 15 and 16 are driven to their high-impedance condition by the voltage on the node 21 going low and the voltage on the node 22 going high, the transistor 17 turns on so that the current caused by collapse of the field around the inductor 24 will have a path to the common node 12. Thus, the transistor 17 functions as the so-called "free-wheeling diode" in a synchronous rectifier, it being understood that the circuit will function even though the gate of the transistor is not driven to the turn-on level. Turning on the transistors with a positive gate voltage maximizes the efficiency of the circuit, however, because the forward drop is greatly reduced.

Figure 2:
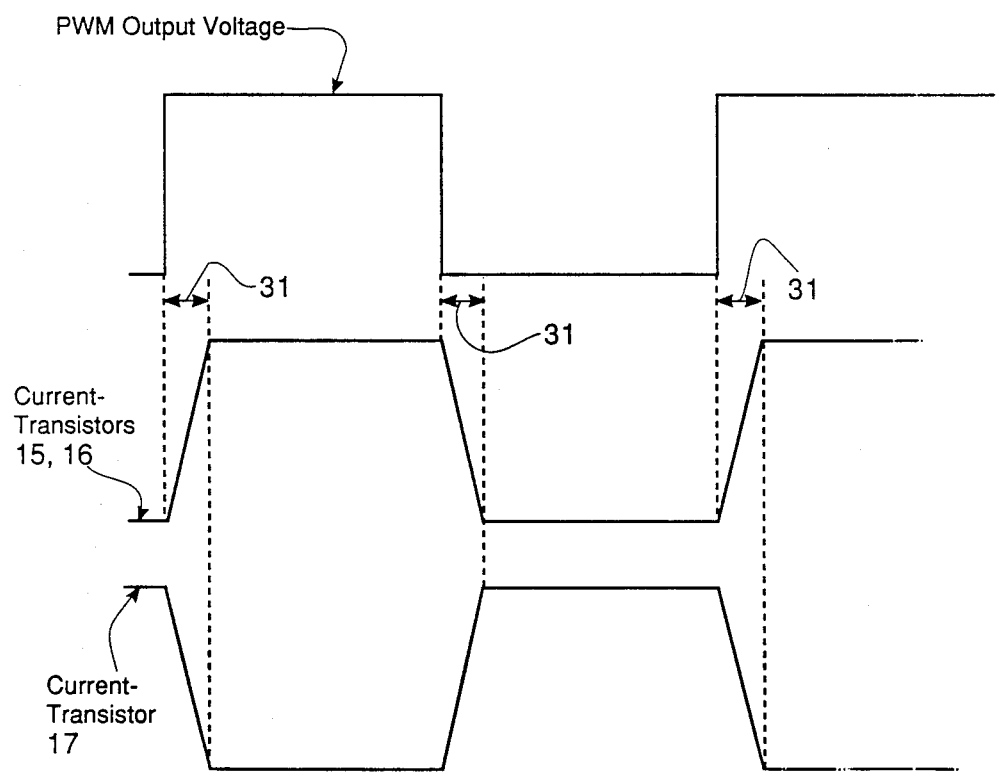
FIG. 2 is a timing diagram of voltage waveforms appearing in the circuit of FIG. 1.

According to one embodiment of the invention, the voltages on the nodes 21 and 22 are controlled by a logic circuit 30 so that during the transition period 31 of FIG. 2, there can be no spurious current pulse caused by the transistors 15 and 16 being on when the transistor 17 is also on. To this end, the output of the invertor 29 is connected to the node 21 through a NOR gate 31 and a buffer 32, and likewise the noninverted output 28 from the pulse width modulator 27 is connected to the node 22 through a NOR gate 33 and a buffer 34, with the other inputs of the two NOR gates 31 and 33 being taken from the nodes 21 and 22 via lines 35 and 36. This logic circuit 30 provides a high-gain bistable operation so that the node 21, for example, cannot go from zero volts toward the high or turn-on level until the node 22 has been driven to zero by the output of the NOR gate 33; thus, when the output 28 goes high, the node 21 cannot go high until the node 22 is already at zero, because the NOR gate 31 will hold the node 21 low until its input via line 36 is below the threshold voltage which operates the NOR gate.

Figure 3:
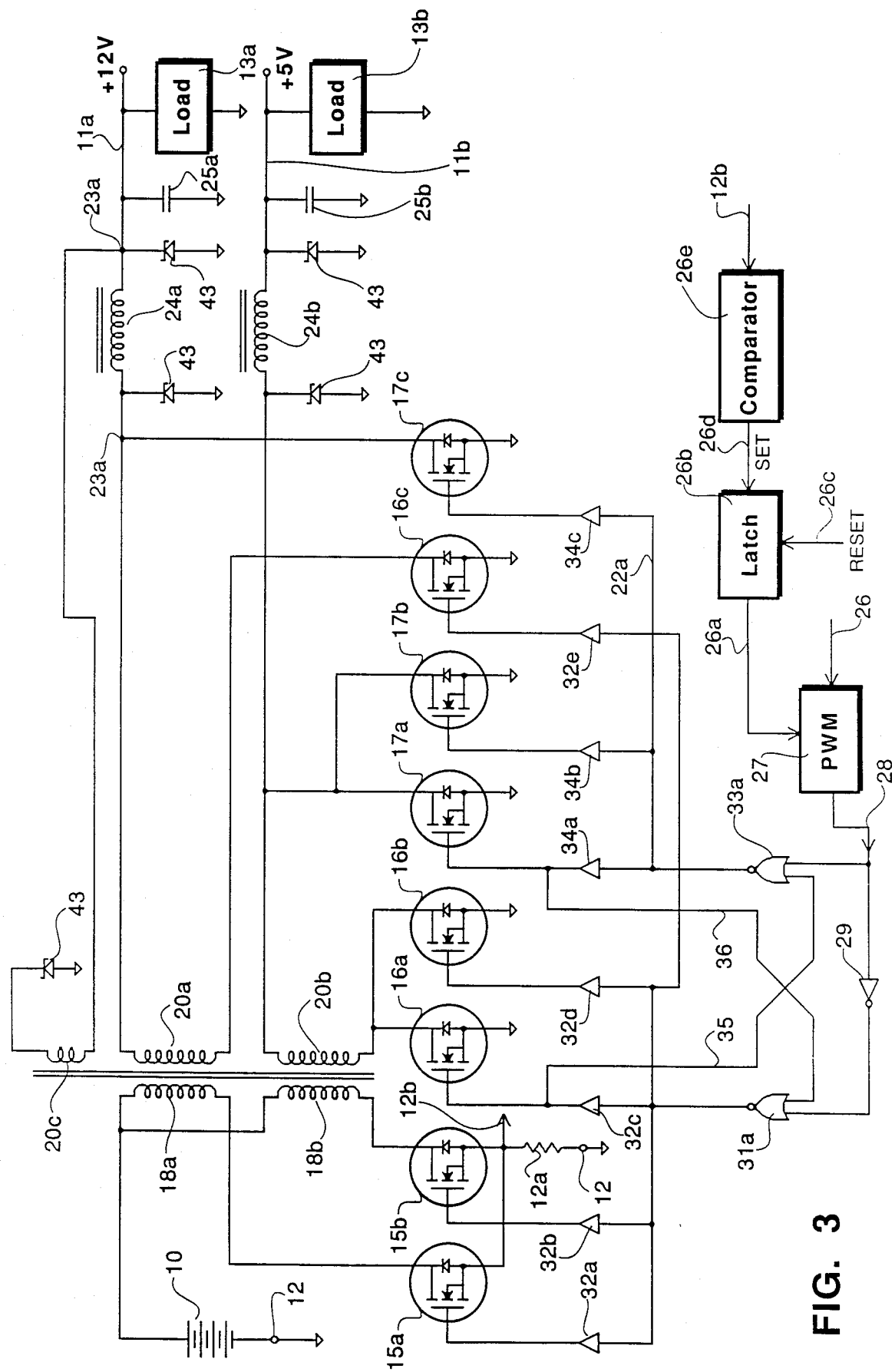
FIG. 3 is an electrical schematic diagram of a synchronous regulator power supply circuit according to another embodiment of the invention.

The gate delays of the MOS transistors used in the logic circuit 30 a quite small compared to the gate voltage rise and fall times of the power MOS transistors 15, 16 and 17. Typically, the gate delay for the type of MOS power transistor is about 10-nsec for turn-on, and about 20-nsec for turn-off, whereas the rise and fall times for these devices is about 70-nsec and 30-nsec, respectively, compared to the logic gate delays of the NOR gates 31 and 33 of about 10-nsec. For this reason, the logic circuit 30 does not appreciably influence the timing of the overall circuit. Referring to FIG. 3, another embodiment of the invention is illustrated in which two different output voltages are produced, and the power transistor devices are duplicated to handle more current. A 12 V battery 10 is used as before as the input, and two primary windings 18a and 18b are employed, each primary winding being connected in series with the source-to-drain path of a separate power transistor 15a or 15b. The gates of these power transistors are separately driven from a node 21a through separate non-inverting buffers 32a and 32b from node 21a. A small resistor 12a is connected in series with the power transistors 15a and 15b and the ground terminal 12, and is used to detect overcurrent in the primary so that the power transistors can be turned off during a cycle to limit current.

On the secondary side in the circuit of FIG. 3, three secondary windings 20a, 20b and 20c are used, producing a 12 V output at node 11a from secondary winding 20a, and a 5 V output at node 11b from the secondary winding 20b. One side of the winding 20b is connected to ground 12 through the source-to-drain paths of a pair of parallel transistors 16a and 16b, corresponding to the transistor 16 of FIG. 1. Likewise, the other side of this winding 20b at node 23a is connected to ground 12 through the source-to-drain paths of a pair of parallel transistors 17a and 17b. The gates of the transistors 16a and 16b are driven from the node 21a through separate non-inverting buffers 32c and 32d, while the gates of the transistors 17a and 17b are driven from a node 22a through separate non-inverting buffers 34a and 34b.

The gates of the power transistors are driven from a logic circuit 30a in a manner to ensure that one set of transistors turns off before the other set turns on, to minimize losses due to switching transients. To this end, the nodes 21a and 22a are driven by NOR gates 31a and 33a, corresponding to the NOR gates 31 and 33 of FIG. 1, and one input to these NOR gates 31a and 33a is from an output 28 of a pulse width modulator 27, and this same output inverted by invertor 29 as before. The cross-coupling lines 35 and 36 in the circuit of FIG. 3, however, are connected to nodes 37 and 38 at the gates of the power transistors 16a and 17a, on the gate side of the buffers 32c and 34a, rather than to the common nodes 21a and 22a which would have been the corresponding situation in FIG. 1. Also, the cross-coupling is in reference to only one of the power transistors 16a or 17a, instead of being taken from a common node for the gates of all the corresponding transistors.

The input 26 of the pulse width modulator 27 in FIG. 3 is connected to the +5 V dc output 11b only, so regulation depends upon the +5 V and +12V outputs tracking each other closely, which they will do in the circuit illustrated. Also, the +5 V supply is more heavily used as it is the supply for all of the microprocessor and memory chips on the motherboard and expansion boards in the computer, and is more critical. A second input 26a to the pulse width modulator 27 is from a latch circuit 26b which is reset every cycle by input 26c, and potentially set during a cycle by an input 26d from a comparator 26e. This comparator receives a reference voltage as one input and receives the voltage across the series resistor 12a via line 12b as the other input; if the current through the primary exceeds a selected limit established by the reference voltage, which is higher than the ordinary regulated operating range of the power supply, then the comparator output 26d will flip the latch each cycle and cause the pulse width modulator to produce a minimum-width or zero-width pulse output.

The secondary circuit for the 12 V supply node 11a is similar to that for the 5 V node 11b, but only one power transistor 16c or 17c is used instead of two transistors in parallel. The source-to-drain path of the transistor 16c connects on side of the secondary winding 20a to ground 12, and the source-to-drain path of the transistor 17c connects a node 23a on the other side of the secondary winding 20a to ground. The gate of the transistor 16c is driven from node 21a through non-inverting buffer 32e, and the gate of the transistor 17c is driven from the node 22a through non-inverting buffer 34c. There is no feedback via the cross-coupling lines 35 and 36 individually from these gates of the transistors 16c and 17c, but instead the timing of the nodes 37 and 38 at the gates of the transistors 16a and 17a is relied upon to be the same. The node 23b is connected to the output 11a and load 13a through an inductor 24a, and a capacitor 25a shunts the load 13a, as before.

The third winding 20c on the secondary side in FIG. 3 is merely a clamping device to limit the voltage on the backswing in the transformer, to protect the transistors. This winding is connected in series with a diode and to the node 11a so the current produced will not be dissipated as heat but will aid in producing the +12 V output. Also seen on the secondary side are a number of Zener diodes 43 which function as protection devices. The Zener diodes 43 on the +5 V line are selected to be about +6.8 V breakdown, and the Zener diodes 43 on the +12 V line are of +15 V breakdown; if the lines 11a and 11b are accidentally shorted together, or if the regulating circuit malfunctions, these Zener diodes prevent destruction of other components of the circuit.

Figure 4:
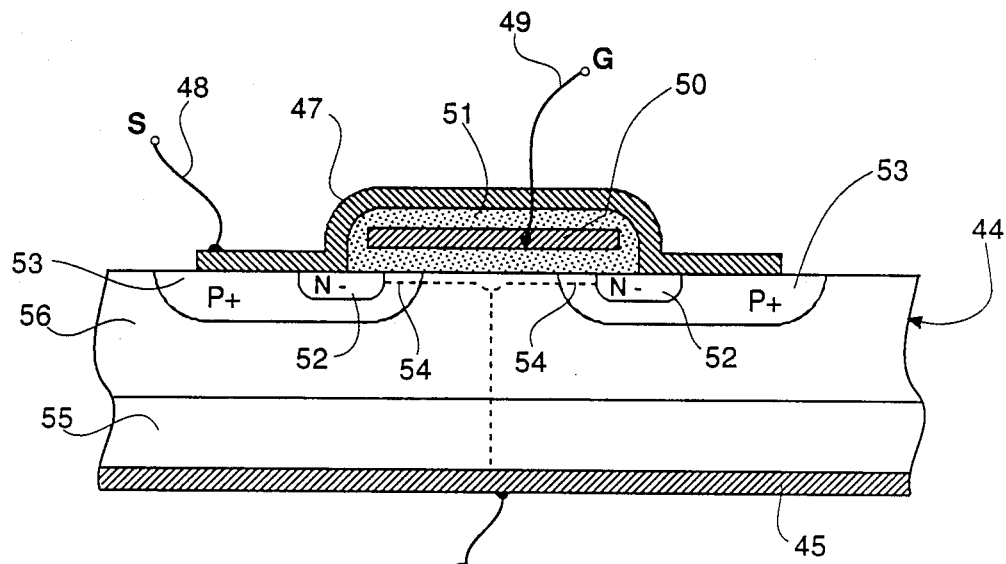
FIG. 4 is an elevation view in section of one of the MOS power transistors used in the circuits of FIGS. 1 or 3.
Figure 5:
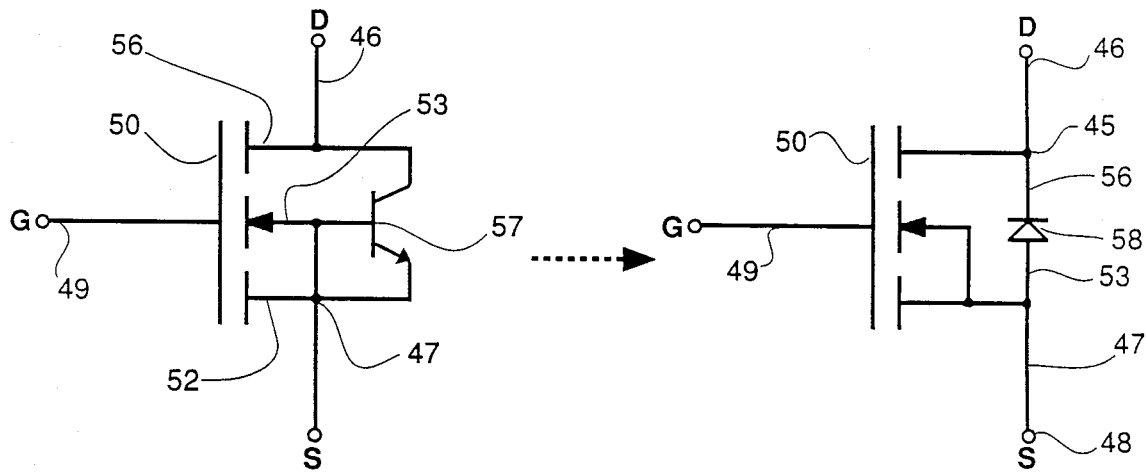
FIG. 5 is an electrical diagram of equivalent circuits for the power transistor device of FIG. 4.

Referring to FIG. 4, one of the power field-effect transistors 15, 16 or 17 used in FIGS. 1 or 3 is shown in a sectional view, greatly enlarged, of course. This device is an N-channel silicon-gate MOS type of transistor constructed on a silicon substrate 44 having a metal contact 45 on the backside functioning as the drain connection 46 and having broad-area metallization 47 on the top functioning as the source connection 48. The gate connection 49 is made to a polysilicon gate layer 50 insulated from the top face of the substrate 44 and from the source metallization 47 by silicon oxide 51, An N+ source region 52 surrounds the gate 50 at the face of the substrate, and a P+ region 53 surrounds and encloses the source region 52. The channel of the N-channel MOS transistor is created by a shallow surface-adjacent region 54 in this P+ region 53 beneath the gate 50. Current flow for the main source-to-drain path is vertical from the drain contact 45 up to the central area beneath the gate 50 through an N+ contact region 55 and an N+ substrate region 56, then laterally through the channel region 54 to the N+ source region 52 and thus to the source contact 47. The source contact shorts across the N+ and P+ regions 52 and 53, so these regions will be at the same potential. The reason for making sure these regions are shorted is to prevent reverse conduction through a parasitic NPN transistor device 57 created by the regions 52, 53 and 56, as seen in FIG. 5. The base and emmitter of this transistor 57 are shorted so there can be no base-emmiter current to inject minority carriers into the base, thus there can be no collector current; the parasitic transistor can be ignored, so the device appears as an N-channel MOS transistor with a parallel PN junction diode 58 created by the P+ region 53 and the N-type region 56 as depicted in the right-hand side of FIG. 5. This diode 58 is connected in the reverse direction, compared to the source-to-drain path carrying the bulk of the current in the primary or secondary windings of FIGS. 1 or 3. The gates and sources will be elongated, interdigitated physical structures in the actual device, in plan view; that is, the channels 54 will be very short, perhaps two or three microns, created by diffusion of P-type impurity from the N+ source regions, but will be very wide, perhaps measured in mils. The currentcarrying capacity is therefore quite large, perhaps 15A.

While the invention has been described with reference to a specific embodiment, the description is not meant to be construed in a limiting sense. Various modifications of the disclosed embodiment, as well as other embodiments of the invention, will be apparent to persons skilled in the art upon reference to this description. It is therefore contemplated that the appended claims will cover any such modifications or embodiments as fall within the true scope of the invention.

What is claimed is:

1. A synchronous rectifier circuit comprising:
    (a) a transformer having a primary winding and a secondary winding;
    (b) first, second and third controlled devices, each having a current path and a control electrode;
    (c) a power supply device;
    (d) a load circuit;
    (e) said primary winding of said transformer being connected in series with said current path of said first controlled device and said power supply device;
    (f) said secondary winding of said transformer being connected in series with said current path of said second controlled device and said load circuit;
    (g) said current path of said third controlled device being connected across said load circuit;
    (h) a drive pulse generator circuit having an output in the form of repetitive pulses of variable duty cycle, said output being coupled to a first control node and said output being inverted and coupled to a second control node;
    (i) a first means detecting when said first control node is in a condition to activate said control electrodes of said first and second controlled devices, said first means first producing and sensing a turn-off level to said control electrode of said third controlled device then producing a turn-on level to said control electrodes of said first and second controlled devices;
    (j) and a second means detecting when said second control node is in a condition to activate said control electrode of said third controlled device, said second means first producing and sensing a turn-off level to said control electrodes of said first and second controlled devices then producing a turn-on level to said control electrode of said third controlled device.

2. A device according to claim 1 wherein said power supply device is a battery.

3. A device according to claim 1 wherein said controlled devices are N-channel, MOS field-effect transistors.

4. A device according to claim 1 wherein said first means detecting includes a NOR gate having an input connected to said second control node.

5. A method of controlling the gate voltages of power transistors in a synchronous regulator power supply of the type having at least first, second and third power transistors, where the first and second transistors have current paths in series with the primary and secondary windings, respectively, of a transformer, and the third transistor has a current path connected across a load, comprising the steps of:
 (a) detecting the voltage across the load and generating repetitive voltage pulses having a pulse width inversely related to said voltage across the load;
 (b) applying said voltage pulses to the gates of said first and second transistors and applying the inverse of said voltage pulses to the gate of said third transistor;
 (c) and detecting the voltage on the gates of said first and second transistors and preventing the gate of said third transistor from rising to a value which would turn on said third transistor unless said voltage on the gate of said first and second transistors is substantially zero.

6. A method according to claim 5 including the step of detecting the voltage on the gate of said third transistor and preventing the gate of said first and second transistors from rising to a value which would turn on said first and second transistors unless said voltage on the gate of said third transistor is substantially zero.

7. A method according to claim 5 wherein said load has an inductor in series therewith, and said third transistor is connected across the inductor and load.

8. A method according to claim 7 wherein a battery is connected in series with said primary winding and said first transistor.

9. A method according to claim 5 wherein said step of detecting includes applying the voltage on the gate of the third transistor to one input of a NOR gate and applying the inverse of said voltage pulses to another input of said NOR gate.

10. A method according to claim 9 wherein said NOR gate is part of a bistable circuit having another input connected to said gates of said first and second transistors.

11. A synchronous rectifier circuit comprising:
 (a) a transformer having a primary winding and a secondary winding;
 (b) at least first, second and third power MOS transistors, each having a source-to-drain path and a gate;
 (c) a power supply device;
 (d) a load circuit having a series inductor;
 (e) said primary winding of said transformer being connected in series with said source-to-drain path of said first power MOS transistor and said power supply device;
 (f) said secondary winding of said transformer being connected in series with said source-to-drain path of said second power MOS transistor and said load circuit, said gates of said first and second power MOS transistors being connected together at a control node;
 (g) said source-to-drain path of said third power MOS transistor being connected across said load circuit;
 (h) a drive pulse generator circuit having an input coupled to said load circuit to detect voltage in said load circuit and having an output in the form of repetitive pulses of variable width, said output being coupled to said control node and said output being inverted and coupled to said gate of said third power MOS transistor;
 (i) and detecting means responsive to said control node being at a positive voltage which would activate said gates of said first and second power MOS transistors, said detecting means connected to prevent said gate of said third power MOS transistor from being at a positive voltage which would activate said third power MOS transistor.

12. A device according to claim 11 wherein said power supply device is a battery.

13. A device according to claim 11 wherein said second and third power MOS transistors are connected for conduction in opposite directions.

14. A device according to claim 11 including second detecting means responsive to said gate of said third power MOS transistor being at a positive voltage which would to activate said third power MOS transistor, said second detecting means connected to prevent said control node from being at a positive voltage which would activate said gates of said first and second power MOS transistors.

15. A device according to claim 11 wherein detecting means includes a NOR gate having an input connected to said control node.

16. A device according to claim 14 wherein said detecting means and said second detecting means include first and second NOR gates connected as a high-gain bistable circuit.

17. A device according to claim 11 wherein said transistors are N-channel devices having N+ source regions surrounding channel and gate regions on a face of a substrate, and having vertical current flow to drain contacts on an opposite face of the substrate.

18. A synchronous rectifier circuit comprising:
 (a) a transformer having a primary winding and a secondary winding;
 (b) at least first, second and third power MOS transistors, each having a source-to-drain path and a gate;
 (c) a power supply device;
 (d) a load circuit having a series inductor;
 (e) said primary winding of said transformer being connected in series with said source-to-drain path of said first power MOS transistor and said power supply device;
 (f) said secondary winding of said transformer being connected in series with said source-to-drain path of said second power MOS transistor and said load circuit;
 (g) said source-to-drain path of said third power MOS transistor being connected across said load circuit;
 (h) a drive pulse generator circuit having an input circuit connected to said load circuit to detect voltage in said load circuit and having an output in the form of repetitive pulses of variable duty cycle, said output being coupled to a first control node and said output being inverted and coupled to a second control node;

(i) a first control means responsive to said first control node which provides a turn-on level to said gates of said first and second power MOS transistors after providing and sensing a turn-off level to said gate of said third power MOS transistor;

(j) and a second control means responsive to said second control node which provides a turn-on level to said gate of said third power MOS transistor after providing and sensing a turn-off level to said gates of said first and second power MOS transistors.

19. A device according to claim 18 wherein said power supply device is a battery.

20. A device according to claim 18 wherein said first and second control means include NOR gates.

* * * * *